United States Patent
Harmke et al.

(10) Patent No.: US 9,998,577 B1
(45) Date of Patent: Jun. 12, 2018

(54) METHOD AND APPARATUS FOR MANAGING NOISE LEVELS USING PUSH-TO-TALK EVENT ACTIVATED VIBRATION MICROPHONE

(71) Applicant: MOTOROLA SOLUTIONS, INC., Chicago, IL (US)

(72) Inventors: Charles B. Harmke, Huntley, IL (US); Daniel Grobe Sachs, Elmhurst, IL (US)

(73) Assignee: MOTOROLA SOLUTIONS, INC., Chicago, IL (US)

(*) Notice: Subject to any disclaimer, the term of this patent is extended or adjusted under 35 U.S.C. 154(b) by 0 days. days.

(21) Appl. No.: 15/626,984

(22) Filed: Jun. 19, 2017

(51) Int. Cl.
| | |
|---|---|
| H04B 15/00 | (2006.01) |
| H04M 1/60 | (2006.01) |
| H04R 3/00 | (2006.01) |
| G06F 3/16 | (2006.01) |
| G10H 1/46 | (2006.01) |
| H04W 4/10 | (2009.01) |
| H04B 1/44 | (2006.01) |

(52) U.S. Cl.
CPC ............ *H04M 1/605* (2013.01); *G06F 3/165* (2013.01); *G10H 1/46* (2013.01); *H04R 3/005* (2013.01); *H04W 4/10* (2013.01); *H04B 1/44* (2013.01)

(58) Field of Classification Search
CPC .......... H04M 1/605; G06F 3/165; G10H 1/46; H04R 3/005; H04W 4/10; H04B 1/44
See application file for complete search history.

(56) References Cited

U.S. PATENT DOCUMENTS

| | | | |
|---|---|---|---|
| 6,104,816 A | * | 8/2000 | Downs, Jr. ............. H04B 1/385 381/190 |
| 7,076,675 B2 | | 8/2006 | Martinez Perez et al. |
| 8,798,289 B1 | | 8/2014 | Every et al. |
| 8,949,639 B2 | | 2/2015 | Kamhi et al. |
| 9,070,374 B2 | | 6/2015 | Konishi et al. |
| 9,406,313 B2 | | 8/2016 | Ryan et al. |
| 9,438,985 B2 | | 9/2016 | Dusan et al. |
| 9,462,552 B1 | | 10/2016 | Murgia et al. |
| 2004/0133421 A1 | | 7/2004 | Burnett et al. |

(Continued)

OTHER PUBLICATIONS

Charles B. Harmke, et al.: "System and Method for Beamforming Audio Signals Received from a Microphone Array", U.S. Appl. No. 15/254,822 filed Sep. 1, 2016, all pages.

Primary Examiner — Andrew L Sniezek
(74) Attorney, Agent, or Firm — Barbara R. Doutre

(57) ABSTRACT

System and method for controlling incoming acoustic signals at a portable accessory communication system provides improved management of noise levels. A plurality of acoustic microphone arrays (120), formed of pairs of acoustic microphones, and a single vibration microphone (130) are enabled by pressing a push-to-talk (PTT) button (108). An audio signal is input to the acoustic microphone arrays and a vibration signal is input to the single vibration microphone. The audio signal is detected and compared to the vibration signal to determine a high noise environment. The single vibration microphone (130) controls beam formation of the acoustic microphone arrays in high noise environments based on predetermined noise thresholds being exceeded and selecting an optimum acoustic microphone pair from the arrays to direct a null targeted at the noise source.

24 Claims, 3 Drawing Sheets

(56) References Cited

U.S. PATENT DOCUMENTS

| | | | |
|---|---|---|---|
| 2008/0026700 A1 | 1/2008 | Smith | |
| 2014/0081631 A1* | 3/2014 | Zhu | G10L 21/0208 704/226 |
| 2016/0134956 A1* | 5/2016 | Tan | H04R 3/005 381/110 |

* cited by examiner

METHOD AND APPARATUS FOR MANAGING NOISE LEVELS USING PUSH-TO-TALK EVENT ACTIVATED VIBRATION MICROPHONE

BACKGROUND OF THE INVENTION

In some public safety radio applications, a portable communication device may incorporate more than one microphone via a microphone array. Such public safety devices are often used in noisy environments, where traffic, sirens, and other noise may be encountered. The management of noise relative to the user's incoming voice into each microphone becomes an important operating aspect of the device. While having more than one microphone helps improve capturing audio signals it also increases the opportunity for noise to be picked up which might interfere with that audio. In devices incorporating more than once microphone, the management of acoustic signals becomes critical so that speech audio can be readily deciphered from noise. It is important that such devices operate well in high noise environments. Challenges associated with attempting to improve audio performance, particularly in portable accessory type devices, include power consumption, parts count, overall size, weight, and audio drops. Devices used in surveillance operations, for example, are particularly challenging in that smaller and lighter devices are desired but the battery power requirements associated with these devices tend to require larger and heavier higher capacity batteries. If smaller capacity batteries are used, the device may not operate over an entire work shift. Movement of a user's head during transmit audio may also cause portions of audio to be missed by a receiving party, such as a dispatcher.

Accordingly, there is a need to improve the management of audio signals input to portable communication devices.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
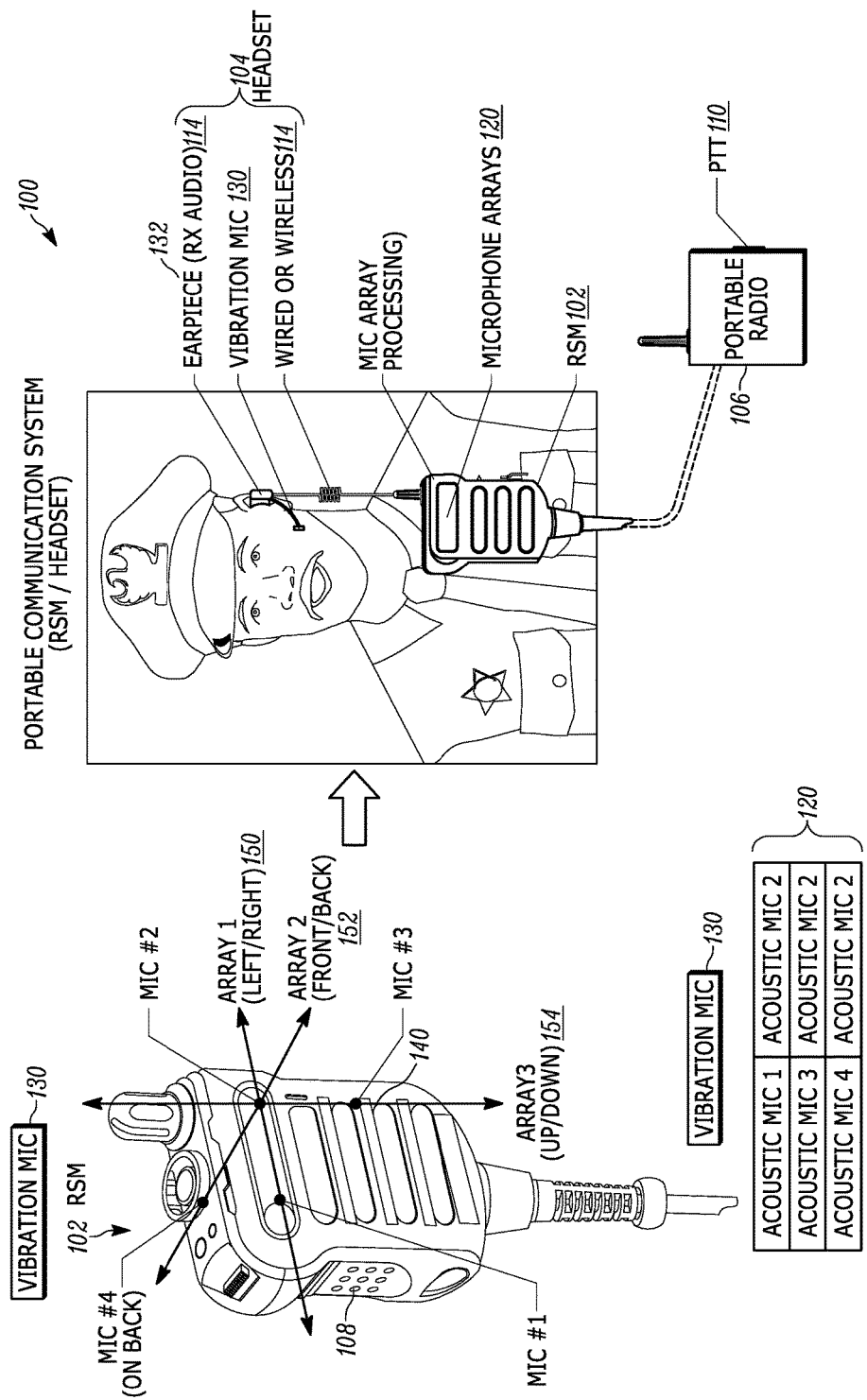
FIG. 1 is a portable communication system formed and operating in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Briefly, there is provided herein a method and apparatus in which different types of microphone sensors are optimally controlled to detect and filter noise when operating under noisy conditions. The improved approach to managing audio signals reduces total system power consumption.

For ease of description, some or all of the exemplary systems presented herein are illustrated with a single exemplar of each of its component parts. Some examples may not describe or illustrate all components of the systems. Other exemplary embodiments may include more or fewer of each of the illustrated components, may combine some components, or may include additional or alternative components.

FIG. 1 is a portable communication accessory system 100 formed and operating in accordance with some embodiments. The portable accessory communication system 100 is formed of first and second portable accessories, operating under the control of a microprocessor. In this embodiment, portable accessory communication system 100 collectively comprises a remote speaker microphone (RSM) 102, under microprocessor control, interoperating with a headset 104. The RSM 102, typically worn upon a user's shoulder, provides remote functionality for predetermined functions associated with a portable radio 106, the portable radio typically being worn at the user's side, and for the purposes of this application not considered an accessory. The radio functions remoted from the portable radio 106 to the RSM 102 may comprise, for example, speaker, microphone and push-to-talk (PTT) button functionalities to name a few.

In accordance with the embodiments, the RSM 102 comprises a push-to-talk (PTT) button 108 and a plurality of acoustic microphones positioned as a plurality of microphone arrays 120. Each of plurality of microphone arrays 120 is formed of a two-microphone pair. The paired acoustic microphones shown in FIG. 1 are oriented as left/right acoustic microphones 150, front/back acoustic microphones 152, and up/down acoustic microphones 154.

The headset 104 comprises a single vibration microphone 130, used for transmit audio, and an earpiece speaker 132 for receive audio. The vibration microphone 130 is used to sense speech induced vibrations on a users head and neck. The vibration microphone 130 typically consumes about 160 mW when active (accumulated between 1.8 V and 3.3 V supplies), which for portable public safety accessory applications is considered too high. Thus, the portable communication accessory system 100 incorporates noise suppression using asymmetric acoustic sensors, where multiple sensors of at least two types are provided, and a sensor of one type consumes significantly more power than the sensors of another type. By incorporating the vibration microphone 130 with the plurality of acoustic microphone arrays 120 of RSM 102 in the manner described herein, the power consumption challenge is advantageously addressed in a satisfactory manner making for an overall accessory system 100 which suitable to portable public safety accessory applications. In accordance with the embodiments, the acoustic microphones (sensors) of portable accessory communication system 100 are controlled to reduce total system power consumption by placing the vibration microphone 130 (the high-power sensor) in a reduced-power state when operating in a mode where the information from the high-power sensor is less important to the performance of the noise-cancelling provided by the plurality of acoustic microphone arrays 120 (the low power sensors).

In accordance with the embodiments, the single vibration microphone 130 may be wired or wirelessly coupled to the RSM 102. For example, the headset 104 may wired via a coaxial cable, or wirelessly coupled over a short range personal area network (PAN) communication link, such as BLUETOOTH, to the RSM 102. The microprocessor of RSM 102 controls the single vibration microphone 130. The single vibration microphone 130 provides limited speech bandwidth with high noise rejection. Integrating the vibration microphone 130 with the headset 104 advantageously provides improved directional alignment of the vibration microphone 130 with a user's mouth and accommodates for movement of a user's head.

The RSM 102 and headset 104 facilitate a hands-free portable environment for portable accessory communication system 100. During usage, the RSM 102 may be mounted via a clip or other attachment means to an epaulette, collar or pocket of a user, while the headset 104 is seated upon the user's ear with the single vibration microphone 130 aligned with the user's mouth. Typical users of remote speaker microphones include, but are not limited to, public safety personnel associated with law enforcement, fire rescue, and medical emergency agencies. The portable radio 106 may be a portable two-way radio operating in a known manner, such as land mobile radio (LMR), where a push-to-talk (PTT) button 110 controls transmission of audio in half-duplex operations.

In accordance with the embodiments, in response to the PTT button 108 of the RSM 102 being activated, such as by being pressed, the plurality of acoustic microphone arrays 120 and single vibration microphone are selectively controlled by the RSM microprocessor to determine changes in environmental noise and optimize operation in response thereto. In accordance with the embodiments, the RSM 102 is operated with the plurality of acoustic microphone arrays 120 turned on and the single vibration microphone 130 of the headset 104 turned on in high noise environments, and the RSM 102 is operated with the plurality of acoustic microphone arrays 120 turned on and the single vibration microphone 130 of the headset 104 turned off in low noise environments.

The high noise rejection of the single vibration microphone 130 advantageously filters noise from the high noise environment. As will be further discussed in FIGS. 2 and 3, the RSM microprocessor determines environmental noise levels from both an audio signal and a vibration signal, wherein the audio signal and the vibration signal are input to the plurality of acoustic microphone arrays 120 of RSM 102 during a press of the PTT button 108. For example, the microprocessor of RSM 102 determines the environmental noise levels from an audio signal input to the acoustic microphone arrays 120, and the same microprocessor determines the environmental noise levels from a vibration signal input to the single vibration microphone 130 of headset 104 during the same press of PTT button 108.

In accordance with the embodiments, when the environmental noise levels are determined to be equivalent at the plurality of acoustic microphones 120 and at the single vibration microphone 130, then a low noise condition is enabled by the RSM microprocessor which turns off the single vibration microphone 130 of headset 104.

The single vibration microphone 130 of the various embodiments may comprise one of: an optical laser microphone, a bone conduction microphone, an in-ear microphone, and a tooth bone conduction microphone, or other vibration conduction type microphone known or yet to be developed.

In accordance with some embodiments, audio coherence over frequency may be tracked between the single vibration microphone 130 and the plurality of acoustic microphone arrays 120. During the tracking of audio coherence, the vibration microphone 130 is enabled for a predetermined noise environment comprising: mid-to-high noise levels. During the audio coherence tracking, the single vibration microphone 130 may be periodically turned off in response to environmental noise levels reaching improved predetermined noise levels, as determined by the microprocessor of RSM 102. This periodic turning off of the vibration microphone 130 beneficially preserves battery life.

In accordance with some embodiments, the single vibration microphone 130 can be used to select an optimum beam formation from the acoustic microphones making up the plurality of acoustic microphone arrays 120 to direct a directional null targeted at a noise source. For example, the single vibration microphone audio can be used to select an optimum signal path from the plurality of acoustic microphone arrays 120 to direct the directional null targeted at the noise source. In accordance with some embodiments, the single vibration microphone 130 selects the optimum acoustic microphone in response to sensing a noise source generating an amount of environmental noise exceeding a predetermined threshold. The single vibration microphone 130, via the RSM microprocessor, manages beam formation of the plurality of acoustic microphones 120. For example, the single vibration microphone 130, via the microprocessor, can manage beam formation of the plurality of microphone arrays 120 in a high noise environment in which the plurality of microphone arrays comprises a plurality of acoustic microphones forming arrays of left/right; up/down; and front/back microphone orientations.

In accordance with some embodiments, the acoustic arrangement of the plurality of microphone arrays may be asymmetrical, wherein perpendicular pairs of acoustic microphones form inverted L-shaped arrays 140, such as the left/right; up/down; and front/back microphone orientations forming the inverted L-shaped arrays 140 of FIG. 1. In accordance with some embodiments, the use of at least two types of microphones, acoustic and vibration, along with asymmetric locations of the acoustic microphones allows for flexibility and control over noise cancellation.

Figure 2:
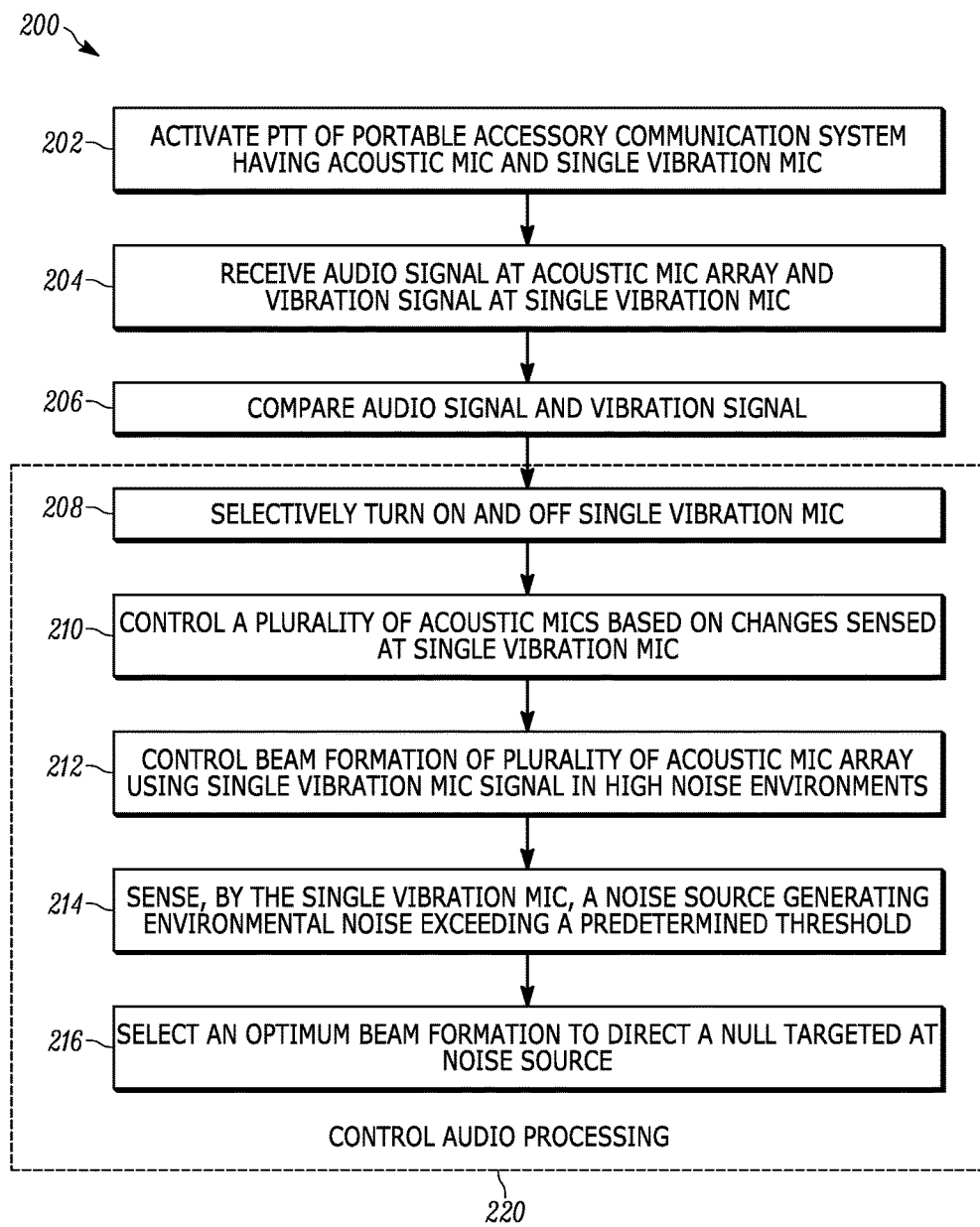
FIG. 2 is a method for managing incoming acoustic signals at a portable communication system formed and operating in accordance with some embodiments.

FIG. 2 is a flowchart of a method 200 of managing incoming acoustic signals at the portable accessory communication system 100. The method 200 begins at 202 by pressing or activating a push-to-talk (PTT) button of a portable communication device. The PTT may be located at one or more devices, such as the PTT 108 of RSM 102, a PTT of the headset 104 and/or the PTT 110 of the radio 106 of FIG. 1. The portable accessory communication device comprises a plurality of microhone arrays 120 and a single vibration microphone 130. At 204, the method continues by receiving an audio signal input to at least one microphone array of the plurality of acoustic microphone arrays 120 and a vibration signal at the single vibration microphone. The audio signal and the vibration signal may then be processed by a microprocessor operatively coupled to the acoustic microphone array and single vibration microphone by comparing the audio signal to the vibration signal to determine a high noise environment. The method 200 then provides controlling audio processing 220 of the at least one microphone array in the high noise environment using the single vibration microphone. One or more audio processing techniques described within audio processing 220 may be used to manage noise levels in response to the PTT activated vibration microphone.

The audio processing 220 may comprise selectively turning on and off the single vibration microphone at 208 to determine changes in environmental noise. The high noise rejection of the single vibration microphone 130 filters noise from a high noise environment. The plurality of acoustic microphones 120 can be controlled at 210, by the RSM's microprocessor, based on changes sensed at the single vibration microphone 130 of the headset 104.

The audio processing of method 200 may further comprise at 212 controlling beam formation of the plurality of acoustic microphone arrays 120 in the high noise environment using the single vibration microphone's 130 signal. The method 200 may further comprise sensing, at 214, a competing noise source generating an amount of environmental noise exceeding a predetermined threshold. The sensing may be based, for example, on the comparison of the audio signal and vibration signal taken back at 206. The audio processing of method 200 may further provide selecting an optimum from an acoustic microphone array of the plurality of acoustic microphone arrays 120 to direct a directional null targeted at the noise source.

In accordance with some embodiments, the power consumption can be minimized by turning off the single vibration microphone 130 in response to the environmental noise levels being determined to be equivalent at both the plurality of acoustic microphones 120 and the single vibration microphone 130, as equivalent noise levels at the plurality of acoustic microphones and the single vibration microphone is indicative of a low noise environment.

In accordance with some embodiments, the method 200 can be enhanced by tracking audio coherence over frequency, wherein the single vibration microphone 130 is enabled for a predetermined noise environment comprising: mid-to-high noise levels. Additionally, the method 200 may be enhanced by periodically turning off the single vibration microphone 130 in response to environmental noise levels improving during tracking, thereby providing for efficient battery usage.

Figure 3:
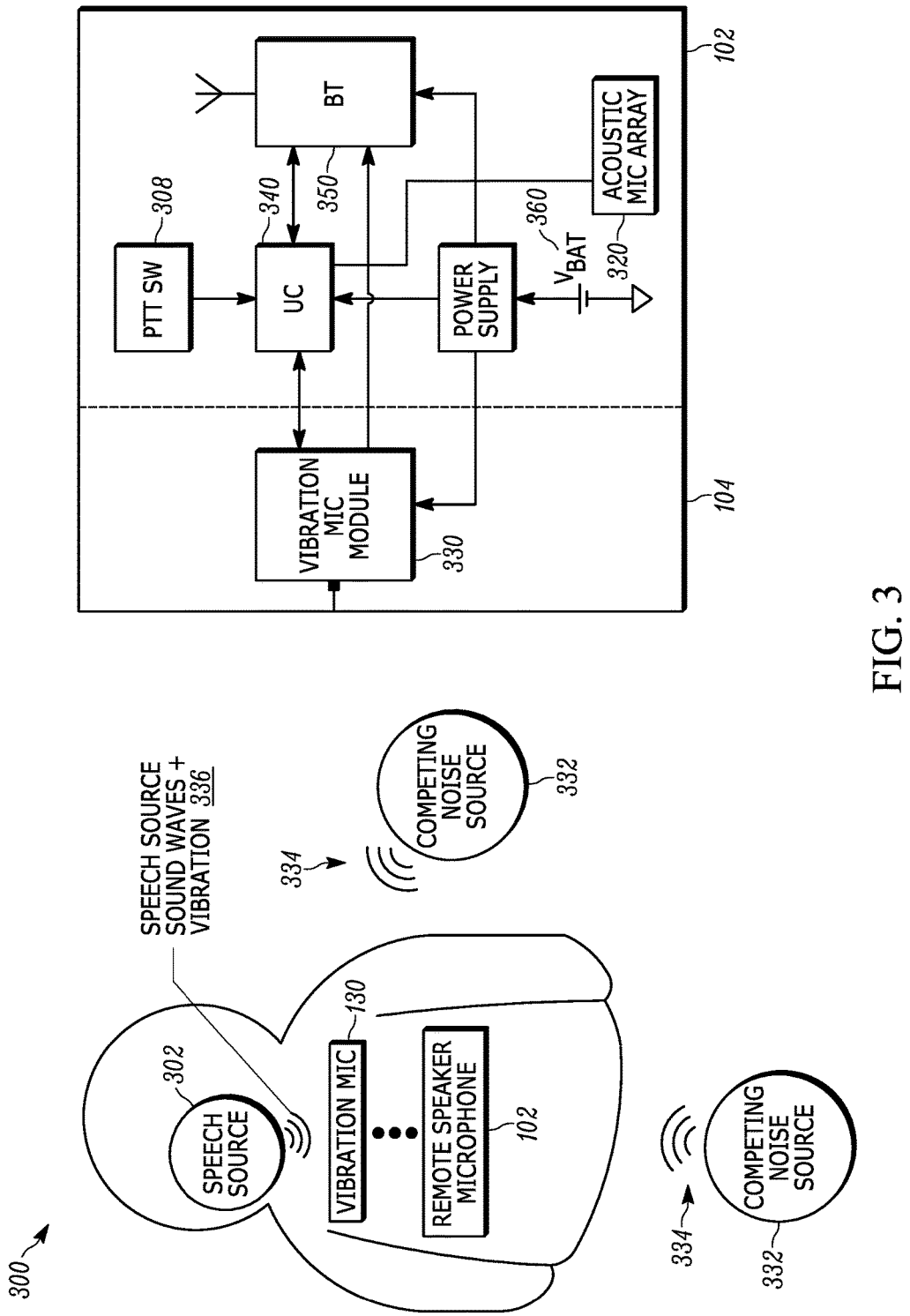
FIG. 3 illustrates a block diagram of a portable communication system formed and operating in accordance with some embodiments.

FIG. 3 illustrates a block diagram of a portable accessory communication system 300 formed and operating in accordance with some embodiments. In this embodiment, the portable accessory communication system 300 collectively comprises the RSM 102 and vibration microphone 130. The RSM 102 and vibration microphone 130 are positioned upon a speech source 302 to receive audio signals 336, the audio signals 336 being detected acoustically (by acoustic microphone array 320 of RSM 102) and vibrationally (by the vibration microphone 130). The vibration microphone 130 may be part of a headset, such as the headset of FIG. 1 or interfaced to an earbud or otherwise suitably positioned to pick up vibrations from the speech source 302. In this embodiment, the RSM 102 comprises a PTT switch 308 which is responsive to a press of a PTT button, such as the PTT button 108 of FIG. 1. The RSM 102 further comprises a microprocessor 340 and a plurality of acoustic microphone arrays 320.

The microprocessor 340 is responsive to the PTT switch 308 for detecting audio signals and vibrations 336 input to the plurality of acoustic microphone arrays 320 and single vibration microphone 130 from the speech source 302. The plurality of acoustic microphone arrays may be configured, for example, in the manner described FIG. 1 or in some other arrangement suitable to device positioning and usage. The RSM 102 further comprises a BLUETOOTH module 350 operatively coupled to microprocessor 340. The BLUETOOTH module 350 provides short range communication between the RSM 102 and the vibration microphone module 330. The processor 340 is thus able to detect and compare the sound waves and the vibration signal to determine a high noise environment and control audio processing of the microphone arrays 320 using the single vibration microphone, in the manner previously described. In a wired embodiment, the components of the RSM 102 and vibration microphone module 330 are powered, directly or indirectly from a battery sourced power supply 360. In a wireless embodiment, the vibration microphone module 330 would have its own battery sourced.

In accordance with some embodiments, the single vibration microphone 130) is used to control beam formation of the plurality of acoustic microphones 120 in high noise environments, the high noise environments being designated by noise sources 332 and noise signals 334. In accordance with some embodiments, the microprocessor 340 of RSM 102 determines environmental noise levels based on signals 336 input to the acoustic microphone arrays 320 and the single vibration microphone 130, during a press of PTT button 108 enabling PTT switch 308. In accordance with the embodiments, the acoustic microphone arrays 320 detect the audio waves while the vibration microphone 130 detects vibration.

More specifically, the microprocessor 340 determines the environmental noise levels from an audio signal input to the acoustic microphones 120 and a vibration signal 304 input to the single vibration microphone 112 during the press of PTT button 108. As described previously, when the environmental noise levels are determined to be equivalent at both the plurality of acoustic microphones 120 and at the single vibration microphone 130, then a low noise condition is enabled by the microprocessor of RSM 102 which turns off the single vibration microphone 130. Turning off the higher power single vibration microphone 130 helps reduce overall power consumption of the portable accessory communication system 300.

The single vibration microphone 130 is periodically turned off in response to environmental noise levels improving to predetermined levels during audio coherence tracking. This periodic turning off of the single vibration microphone 130 preserves battery life of RSM battery 360. Wireless coupling may be implemented through the BLUETOOTH module 350 of the RSM 102.

As a use case example, continuing to refer to FIG. 3, a user, such as an officer, provides a speech source 302, indicated as audio signal 336 having sound waves and vibration, at the single vibration microphone 130. The proximity and direction of the vibration towards the vibration microphone is detected at vibration microphone module 330. As a result, the acoustic microphone arrays 320 are able to pick up the officer's voice, despite some level of ambient noise.

The method and apparatus for managing noise levels using the PTT event activated vibration microphone of the various embodiments is particularly useful for communication devices needing noise suppression. The various embodiments provide for turning on and off a single vibration microphone operating as a high noise sensor as well as using the vibration microphone to filter the high noise levels to improve overall audio. Sampling can occur at a periodic rate without any need for rate adjustments, and the turning off of sampling during recognized periods of low noise environments helps preserve battery power. The additional ability to use the detection by the vibration microphone 130 to trigger the selection of acoustic microphone arrays 320 and direct nulls to a noise source provides overall enhancements not previously available. The single vibration microphone incorporated within a portable accessory such as an ear bud or headset, for example, provides an unobtrusive approach to interoperating with other portable accessories, such as the RSM 102, to facilitate police surveillance operations in high noise environments.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of managing incoming acoustic signals at a portable accessory communication system, the method comprising:
    activating a push-to-talk (PTT) button to enable at least one microphone array formed of paired acoustic microphones and enable a single vibration microphone within the portable accessory communication system;
    receiving an audio signal input to the at least one microphone array and a vibration signal at the single vibration microphone;
    detecting, by a microprocessor communicatively coupled to the at least one microphone array, the audio signal and the vibration signal;
    comparing, by the microprocessor, the audio signal to the vibration signal to determine a high noise environment, during the PTT button activation;
    controlling audio processing of the at least one microphone array in the high noise environment using the single vibration microphone; and
    turning off the single vibration microphone in response to environmental noise levels being determined to be equivalent at the at least one microphone array and the single vibration microphone.

2. The method of claim 1, wherein a high noise rejection associated with the single vibration microphone filters noise from the high noise environment.

3. The method of claim 1, where one or more signal paths from the at least one microphone array is disabled in response to the environmental noise levels being determined to be equivalent at the at least one microphone array and the single vibration microphone.

4. The method of claim 1, wherein equivalent noise levels at the at least one microphone array and the single vibration microphone is indicative of a low noise environment.

5. A method of managing incoming acoustic signals at a portable accessory communication system, the method comprising:
activating a push-to-talk (PTT) button to enable at least one microphone array formed of paired acoustic microphones and enable a single vibration microphone within the portable accessory communication system;
receiving an audio signal input to the at least one microphone array and a vibration signal at the single vibration microphone;
detecting, by a microprocessor communicatively coupled to the at least one microphone array, the audio signal and the vibration signal;
comparing, by the microprocessor, the audio signal to the vibration signal to determine a high noise environment;
controlling audio processing of the at least one microphone array in the high noise environment using the single vibration microphone;
tracking audio coherence between the single vibration microphone and the at least one acoustic microphone array over frequency, wherein the single vibration microphone is enabled for a predetermined noise environment comprising: mid-to-high noise levels; and
periodically turning off the single vibration microphone in response to environmental noise levels improving during tracking.

6. A method of managing incoming acoustic signals at a portable accessory communication system, the method comprising:
activating a push-to-talk (PTT) button to enable at least one microphone array formed of paired acoustic microphones and enable a single vibration microphone within the portable accessory communication system;
receiving an audio signal input to the at least one microphone array and a vibration signal at the single vibration microphone;
detecting, by a microprocessor communicatively coupled to the at least one microphone array, the audio signal and the vibration signal;
comparing, by the microprocessor, the audio signal to the vibration signal to determine a high noise environment; and
controlling audio processing of the at least one microphone array in the high noise environment using the single vibration microphone by controlling beam formation of the at least one microphone array using the single vibration microphone during high noise-environments.

7. The method of claim 6, further comprising:
determining, based on comparing, a noise source generating an amount of environmental noise exceeding a predetermined threshold; and
selecting an optimum beam formation from the paired acoustic microphones forming the at least one microphone array to direct a directional null targeted at the noise source.

8. A portable accessory communication system, comprising:
a plurality of microphone arrays, under microprocessor control, having a plurality of paired acoustic microphones;
a single vibration microphone, the single vibration microphone providing limited speech bandwidth with high noise rejection;
a push-to-talk (PTT) button, wherein in response to the PTT button being pressed, the plurality of microphone arrays and single vibration microphone being used to determine changes in environmental noise; and
wherein the portable accessory communication system is operated with the plurality of microphone arrays turned on and single vibration microphone turned on in high noise environments; and
wherein the portable accessory communication system is operated with the plurality of acoustic microphones turned on and the single vibration microphone turned off in low noise environments.

9. The portable accessory communication system of claim 8, wherein the portable accessory communication system comprises a remote speaker microphone (RSM) interoperating with a headset, wherein the RSM comprises the plurality of microphone arrays and the headset comprises the single vibration microphone.

10. The portable accessory communication system of claim 8, wherein a high noise rejection associated with the single vibration microphone filters noise from the high noise environment.

11. The portable accessory communication system of claim 10, wherein the microprocessor determines environmental noise levels from the audio signal input to the plurality of microphone arrays and a vibration signal input to the single vibration microphone during the PTT button press.

12. The portable accessory communication system of claim 11, wherein a low noise condition is enabled by the microprocessor and the single vibration microphone is turned off, in response to the environmental noise levels being equivalent at the plurality of microphone arrays and at the single vibration microphone.

13. The portable accessory communication system of claim 11, wherein a low noise condition is enabled by the microprocessor where one or more signal paths from the plurality of microphone arrays is disabled in response to the environmental noise levels being determined to be equivalent at the plurality of microphone arrays and the single vibration microphone.

14. The portable accessory communication system of claim 8, wherein the plurality of microphone arrays are formed of perpendicular pairs of acoustic microphones forming an inverted L-shaped array within a first portable accessory, and the single vibrator microphone is located within a second portable accessory.

15. The portable accessory communication system of claim 8, wherein the vibration microphone comprises one of: an optical laser microphone, a bone conduction microphone, an in-ear microphone, and a tooth bone conduction microphone.

16. The portable accessory communication system of claim 8, wherein the single vibration microphone tracks audio coherence between the single vibration microphone and plurality of microphone arrays over frequency.

17. The portable accessory communication system of claim 8, wherein the single vibration microphone is periodically turned off in response to environmental noise levels improving to predetermined levels during audio coherence tracking.

18. The portable accessory communication system of claim 8, wherein a signal of the single vibration microphone is used to control beam formation of the plurality of microphone arrays in high noise environments.

19. The portable accessory communication system of claim 8, wherein the single vibration microphone audio is used to select an optimum signal path from the plurality of microphone arrays to direct a directional null targeted at a noise source.

20. The portable accessory communication system of claim 8, wherein the single vibration microphone selects the optimum acoustic microphone array in response to sensing a noise source generating an amount of environmental noise exceeding a predetermined threshold.

21. The portable accessory communication system of claim 8, wherein the single vibration microphone, via the microprocessor, manages beam formation of the plurality of microphone arrays in a high noise environment in which the plurality of microphone arrays comprises a plurality of acoustic microphones forming arrays of left/right; up/down; and front/back microphone orientations.

22. The portable accessory communication system of claim 8, wherein the single vibration microphone is located in a headset, and the plurality of microphone arrays are located in a remote speaker microphone.

23. A method of managing incoming acoustic signals at a portable accessory communication system, the method comprising:

activating a push-to-talk (PTT) button to enable at least one microphone array formed of paired acoustic microphones and enable a single vibration microphone within the portable accessory communication system;

receiving an audio signal input to the at least one microphone array and a vibration signal at the single vibration microphone;

detecting, by a microprocessor communicatively coupled to the at least one microphone array, the audio signal and the vibration signal;

comparing, by the microprocessor, the audio signal to the vibration signal to determine a high noise environment or a low noise environment;

turning on the plurality of microphone arrays and single vibration microphone in high noise environments; and turning on the plurality of microphone arrays and turning off the single vibration microphone in low noise environments.

24. The method of claim 23, further comprising:

periodically turning off the single vibration microphone in response to environmental noise levels reaching improved predetermined noise levels.

* * * * *